United States Patent [19]
Whang

[11] 4,437,862
[45] Mar. 20, 1984

[54] WATER-PROOF BRIQUETTE AND METHOD FOR PRODUCTION THEREOF

[75] Inventor: Kyu B. Whang, Seoul, Rep. of Korea

[73] Assignee: International Monopoly Association, Tokyo, Japan

[21] Appl. No.: 335,541

[22] Filed: Dec. 29, 1981

[30] Foreign Application Priority Data

Oct. 6, 1981 [JP] Japan ................................ 56-158127

[51] Int. Cl.$^3$ .......................... C10L 5/10; C10L 11/00
[52] U.S. Cl. .............................................. 44/6; 44/1 R; 44/17; 44/20
[58] Field of Search .................... 44/6, 10 C, 10 R, 17, 44/20

[56] References Cited

U.S. PATENT DOCUMENTS

| 2,076,497 | 4/1937 | Ellis | 44/6 |
| 2,816,013 | 12/1957 | Powell | 44/6 |
| 2,835,563 | 5/1958 | Dohmen | 44/15 R |
| 3,385,681 | 5/1968 | Mennen | 44/17 |
| 3,431,093 | 3/1969 | Kreinik | 44/41 |
| 3,955,937 | 5/1976 | Whang | 44/25 |
| 3,988,121 | 10/1976 | Leveskis | 44/17 |

Primary Examiner—Delbert E. Gantz
Assistant Examiner—Anthony McFarlane
Attorney, Agent, or Firm—Antonelli, Terry & Wands

[57] ABSTRACT

A perfectly water-proof, clean, safe and hygienic briquette easily ignitable with match flame, having a layer of nitrocotton and/or cellulose acetate on the surface of a molded product of powders of a combustible solid material and an oxidizing agent, said product being bound by nitrocotton and/or cellulose acetate or a wax.

19 Claims, No Drawings

WATER-PROOF BRIQUETTE AND METHOD FOR PRODUCTION THEREOF

The present invention relates to a briquette excellent in water-proofing and ignition and a method for producing the same.

Heretofore, solid fuels such as coal, charcoal, fire wood and various briquettes such as perforated briquette and oval briquette were used for interior heating, indoor and outdoor cooking, camp fires and the like.

When such a kind of fuel is used, because of the difficulty in ignition by using only match flame, there have been used such methods, for example, that a paper or a thin fire wood sufficiently dried is ignited and then said solid fuel is ignited by them or that a liquid petroleum fuel such as kerosene or light oil is poured on said solid fuel, the liquid is then ignited with match flame and the solid fuel is ignited by utilizing this combustion heat. The former method requires much labor, is troublesome and takes long time before ignition of said fuel. The latter method is not only dangeous but also induces explosive combustion with black smoke, thereby, sometimes, burning clothes and/or hairs and, furthermore, getting burnt or, sometimes, smudging clothes and human bodies with black smoke. Even after such a method is used, ignition of the solid fuel is still difficult and it is necessary to repeat the same means several times. Consequently, unpleasant odor of petroleum fuel hangs over in the vicinity causing poor taste in the case of barbecue cooking and the like and it is also undesirable from a view point of environmental hygiene. Furthermore, when coal, briquette or oval briquette is used as a solid fuel, there causes a problem that hands, clothes, vessels to carry it and the like are stained.

In addition, said solid fuels can not be used at humid places or after they get wet. Accordingly, it is required to keep solid fuels carefully so that they do not absorb moisture or get wet. Also there causes a problem that, once they absorb moisture or get wet, they can be barely used after sufficient drying and it takes fairly long time to make them perfectly dry.

As to a briquette wherein water-proofing is taken into consideration, U.S. Pat. No. 3,955,937 discloses a method wherein a solution prepared by dissolving a resin in alcohol is used as a binder and applied on the surface of a molded product. However, this method is not satisfactory, because the resin used is so soluble in alcohols e.g., rosin, that it is not sufficiently water-proof by itself, and permeation of water into the inner part of briquette thus obtained cannot be prevented after it contacts with much moisture for a long time. Increasing in coating thickness of the surface resin in order to improve water-proofing of the briquette is not economical and also induces much troubles, e.g. generation of smoke or offensive odor, etc., depending on the resin employed.

The present inventor eagerly investigated to obtain water-proof briquette having a nice ignition capability without such defects as mentioned above. As the result, he succeeded in obtaining perfectly water-proof, clean, safe and hygienic briquette having a nice ignition capability by using, as a binder, wax or a solution of nitrocotton and/or a solution of cellulose acetate and further, as a surface coating agent, a solution of nitrocotton and/or a solution of cellulose acetate.

The present invention provides water-proof briquette (hereinafter called as the first briquette) having a layer of nitrocotton and/or cellulose acetate on the surface of a molded product of powders of a combustible solid material and an oxidizing agent, said product being bound by nitrocotton and/or cellulose acetate.

The present invention further provides water-proof briquette (hereinafter called as the second briquette), having a layer of nitrocotton and/or cellulose acetate on the surface of a molded product of powders of a combustible solid material together with or without an oxidizing agent, said product being bound by a wax.

The present invention further provides methods for preparing the first and second briquettes.

The powders of combustible solid materials usable in the present invention include charcoal powders, saw dusts, coal powders, coke powders and the like. They can be used individually or in combination. Though there is no particular limitation on the size of powders of combustible materials, the finer the more desirable.

The oxidizing agent usable in the present invention is preferably a strong one such as, for example, potassium chlorate. In order to prevent generation of offensive odor or a hazardous gas, it is desirable to use potassium chlorate, potassium nitrate or potassium permanganate as the oxidizing agent. These oxidizing agents can be used individually or in combination.

The nitrocotton and cellulose acetate in the present invention are those generally known as nitrocellulose and acetylcellulose. They are used in a form of a solution prepared by dissolving them in a solvent. The nitrocotton includes strong nitrocotton having a high nitrogen content, pyronitrocotton having a medium nitrogen content, weak nitrocotton having a comparatively low nitrogen content, brittle nitrocotton having a nitrogen content of 10% or less and the like. In the present invention, any kind of them can be used. However, the use of brittle nitrocotton is desirable from a hygienic point of view, because no odor is generated in combustion. As the solvent used to dissolve nitrocotton and cellulose acetate, those which can dissolve nitrocotton and cellulose acetate and, in addition, have a high volatility are desirable. Solvents which can be used in the present invention include alcohols, esters, ketones and the like. Among them, acetone and a mixed solvent of acetone-amyl acetate are preferred from a viewpoint of workability.

Wax used in the present invention may be an animal one, a vegetable one, a mineral one or a petroleum one and may be liquid or solid at the normal temperature. As the wax, it is desirable to use one which generates little odor and/or hazardous gas in combustion. Ceresine is most preferred. Ceresine is an amorphous waxy material obtained by purifying ozokerite and a purified petroleum wax.

Hereinafter the method for the manufacture of the first briquette of the present invention will be described in detail. At first, the oxidizing agent is mixed with powders of the combustible solid materials. One of the mixing methods is effected by dissolving the oxidizing agent in water and adding thereto powders of the combustible solid materials, before mixing. Another method is that the oxidizing agent is ground into fine powders and they are well mixed with powders of the combustible solid materials. When the oxidizing agent is dissolved in water, it is preferable to heat water because of elevation of dissolution velocity. When water is used, the mixture, after mixing, is sufficiently dried and cooled to the room temperature.

To the mixture thus obtained is added a solution of nitrocotton and/or a solution of cellulose acetate. The mixture is further admixed and molded by means of a compression molding process to obtain a molded product having a desired shape. The solution of nitrocotton and the solution of cellulose acetate can be used individually each, or in combination. A solution prepared by dissolving nitrocotton and cellulose acetate in a solvent at the same time may also be used. In the present invention, the compression molding process is not particularly limited and any type of known briquette molding machine such as ram type or roll type may be used for the molding to get the desired shape.

A solution of nitrocotton and/or a solution of cellulose acetate is applied on the surface of the molded product thus obtained and then the product is dried. Also in this case, the solution of nitrocotton and the solution of cellulose acetate can be used individually each or in combination. Also there may be used a solution prepared by dissolving nitrocotton and cellulose acetate in a solvent at the same time. Though the object of the present invention can be achieved by applying the solution of nitrocotton and/or the solution of cellulose acetate on a molded product usually once, it is preferable to apply twice or more. In the present invention, the method for application is not particularly limited and a conventional method such as spraying, immersion or coating with a brush can be used.

The first briquette of the present invention obtained in accordance with the method described above is extremely excellent in water-proofing. When it is immersed in water for a long time, no water permeates into the inner part of the briquette and it can be easily ignited with match flame soon after it is taken out of water. Also the briquette of the present invention can be cleanly handled since particles are not taken off from the surface of the briquette. The present briquette does not stain hands blackly when held by hand. In addition, it is hygienic since it generates no smoke, offensive odor, hazardous gas and the like in combustion and the combustion lasts long; accordingly, it can be used as the prime fuel for barbecue cooking and the like as well as the fuel for ignition. Furthermore, it can be conveniently carried because of light weight.

The second briquette of the present invention is manufactured according to the method mentioned below. When the oxidizing agent is used, powders of combustible solid materials are dissolved in an aqueous solution of the oxidizing agent followed by mixing, or the oxidizing agent is ground into fine powders to which powders of combustible solid materials are added followed by sufficient mixing. Wax is added to the mixture after sufficient drying in the former case and to the mixture itself in the latter case. When no oxidizing agent is used, wax is added to powders of combustible solid materials themselves and then they are mixed. When a solid wax is used, the wax is mixed in such a manner that, after adding the wax, the mixture is heated to melt wax for effective mixing. As to the method to add the solid wax, the wax may be molten by heating, to which powders of a combustible sodil materials and, if necessary, the oxidizing agent are then added followed by mixing.

The mixture thus obtained is molded by means of compression molding method to obtain a molded product having a desired shape. The molded product is cooled to the room temperature after the compression molding. There is no particular limitation of the compression molding method in this case and any of conventional methods may be used.

A solution of nitrocotton and/or a solution of cellulose acetate is applied on the surface of the molded product thus obtained. The solution of nitrocotton and the solution of cellulose acetate may be used individually each or in combination. Also there may be used a solution prepared by dissolving nitrocotton and cellulose acetate in a solvent at the same time. There is no particular limitation on the method for application and any of conventional methods may be used. Though the object of the present invention can be achieved by applying said solution once, it is preferable to apply twice or more.

The second briquette of the present invention obtained in accordance with the method described above is extremely excellent in water-proofing, too. Even if the briquette is immersed in water for a long time, no water permeates into the inner part of the briquette and it can be easily ignited with match flame soon after it is taken out of water. Also the briquette of the present invention can be cleanly handled since particles do not come off from the surface of the briquette or the briquette does not stain hands blackly when held by hands. In addition, it is hygienic since it generates no smoke, offensive odor, hazardous gas and the like in combustion. Further, it can be conveniently carried because of light weight. The second briquette of the present invention burns generating a flame in combustion. Accordingly, it is advantageously used as an ignition fuel to ignite other prime fuels.

As described above, the briquette of the present invention has excellent performances. Consequently, the briquette is appropriately used as a fuel for, for example, indoor and outdoor barbecue; an ignition fuel and a prime fuel; a fuel used in bad weather in mountain-climbing, camping and the like; a fuel used at humid places and particularly an emergency fuel used when a disaster occurs.

In the present invention, amounts of the materials to be employed except the powders of combustible solid materials can be decided properly from an economical point of view as well as taking into consideration of their work.

EXAMPLE 1

Two grams of potassium chlorate and 0.5 g of potassium nitrate were dissolved in 20 ml of water while heating. To this solution was added 66 g of charcoal powders. After sufficient agitation and mixing, the mixture was dried and cooled to the room temperature. To this mixture was added a solution of brittle nitrocotton (a solution prepared by dissolving 15 g of brittle nitrocotton in 180 ml of acetone) followed by mixing. Then, the final mixture was subjected to compression molding to obtain a cylindrical molded product having a diameter of 4 cm and a thickness of 2 cm.

On the surface of the molded product thus obtained was applied a solution of brittle nitrocotton (a solution prepared by dissolving 20 g of brittle nitrocotton in 100 ml of acetone) followed by drying. A water-proof briquette was obtained by further applying a solution prepared by dissolving 20 g of brittle nitrocotton and 3 g of cellulose acetate in 150 ml of acetone on said coated product followed by drying.

EXAMPLE 2

One gram of potassium chlorate and 1 g of potassium nitrate were dissolved in 20 ml of water while heating. To this solution was added 33 g of charcoal powders. After sufficient agitation and mixing, the mixture was dried and cooled to the room temperature. To this mixture was added a solution of brittle nitrocotton (a solution prepared by dissolving 7 g of brittle nitrocotton in 40 ml of acetone) followed by mixing. Then, the final mixture was subjected to compression molding to obtain a molded product similar to that in Example 1.

On the surface of the molded product thus obtained was applied a solution of brittle nitrocotton (a solution prepared by dissolving 20 g of brittle nitrocotton in 100 ml of acetone) followed by drying. A solution prepared by dissolving 20 g of brittle nitrocotton and 3 g of cellulose acetate in 150 ml of acetone was further applied on said coated product, followed by drying to obtain a water-proof briquette.

EXAMPLE 3

One gram of potassium chlorate and 1 g of potassium nitrate were ground into fine powders. To these powders was added 30 g of charcoal powders followed by sufficient mixing. To this mixture was added a solution of cellulose acetate (a solution prepared by dissolving 7 g of cellulose acetate in 70 ml of acetone) followed by mixing. The final mixture was subjected to compression molding to obtain a molded product similar to that in Example 1.

A water-proof briquette was obtained by applying a solution of brittle nitrocotton (a solution prepared by dissolving 25 g of brittle nirtrocotton in 100 ml of acetone) on the surface of said molded product thus obtained followed by drying.

EXAMPLE 4

One gram of potassium chlorate and 2 g of potassium nitrate were ground into fine powders. To these powders were added 25 g of charcoal powders and 10 g of coal powders followed by sufficient mixing. To this mixture was added a solution of brittle nitrocotton (a solution prepared by dissolving 4 g of brittle nitrocotton in 40 ml of acetone) followed by mixing. Then the final mixture was subjected to compression molding to botain a molded product similar to that in Example 1.

A water-proof briquette was obtained by applying a solution of brittle nitrocotton (a solution prepared by dissolving 15 g of brittle nitrocotton in 100 ml of acetone) on the surface of said molded product thus obtained followed by drying.

Products produced in Examples 1–5 were immersed in water for two days and then taken out of water. They could be easily ignited with match flame soon and were continuously burnt without much flame.

EXAMPLE 5

A water-proof briquette was obtained in accordance with the same procedure as that in Example 4 except that charcoal powders and coal powders were used by 30 g and 15 g, respectively.

EXAMPLE 6

Three grams of charcoal powders and 3 g of saw dusts were immersed in an aqueous solution of a small amount of nitre, followed by drying. To this mixture was added 5 g of ceresine and they were heated for melting ceresine and then sufficiently mixed. The final mixture was subjected to compression molding to obtain a cylindrical molded product having a diameter of 4 cm and a thickness of 2 cm.

A water-proof briquette was obtained by applying a solution of brittle nitrocotton (a solution prepared by dissolving 0.5 g of brittle nitrocotton in 2 ml of acetone) on the surface of said molded product thus obtained followed by drying.

EXAMPLE 7

Five point five grams of ceresine wax was heated and molten, to which 6 g of saw dusts was added followed by sufficient mixing. The mixture was subjected to compression molding to obtain a molded product similar to that in Example 6.

A water-proof briquette was obtained by applying a solution of brittle nitrocotton (a solution prepared by dissolving 0.5 g of brittle nitrocotton in 2 ml of acetone) on the surface of said molded product thus obtained followed by drying.

Products produced in Examples 6 and 7 were put in water for two days and then taken out of water. They could be easily ignited with match flame soon and were continuously burnt with flame.

COMPARISON EXAMPLE 1

Seventy parts by weight of charcoal powder and 10 parts by weight of pulp powder were put in 10 parts by weight of water dissolving 1 part by weight of potassium nitrate. They were well mixed, left for three hours and then heated at 70° C. until they were dried up. To the resulting mixture was added a solution prepared by dissolving 20 parts by weight of resin (rosin) in 100 ml of ethanol and they were well mixed. The mixture was compression molded to obtain a cylindrical molded product having a diameter of 4 cm and a thickness of 2 cm.

On the surface of the molded product was applied a solution of 20 parts by weight of rosin dissolved in 100 ml of ethanol, twice, followed by drying.

The product thus obtained was put in water for three hours and then taken out of water. It could not be ignited with match flame.

I claim:

1. A water-proof briquette having a water-impermeable, separate, continuous layer of brittle nitrocotton and/or cellulose acetate on the surface of a molded product of powders of a combustible solid material and an oxidizing agent, said product being bound by brittle nitrocotton and/or cellulose acetate.

2. The water-proof briquette as claimed in claim 1, wherein the molded product of powders of a combustible solid material and an oxidizing agent is bound by being admixed with a solution of brittle nitrocotton and/or cellulose acetate and by compression molding of the resulting admixture.

3. The water-proof briquette as claimed in claim 1, wherein said product is bound by brittle nitrocotton.

4. A water-proof briquette having a water-impermeable, separate, continuous layer of brittle nitrocotton and/or cellulose acetate on the surface of a molded product of powders of combustible solid material, said product being bound by ceresine.

5. A water-proof briquette having a water-impermeable, separate, continuous layer of brittle nitrocotton and/or cellulose acetate on the surface of a molded product of powders of a combustible solid material and an oxidizing agent, said product being bound by ceresine.

6. The water-proof briquette as claimed in claim 4 or 5, wherein the layer on the surface of the molded product consists essentially of brittle nitrocotton.

7. The water-proof briquette as claimed in any one of claims 1 to 5 wherein the powders of the combustible solid material are at least one kind of charcoal powders, saw dusts, coal powders and coke powders.

8. The water-proof briquette as claimed in claim 7, wherein the combustible material is charcoal powder.

9. The water-proof briquette as claimed in claim 1 or 5 wherein the oxidizing agent is at least one kind of potassium chlorate, potassium nitrate and potassium permanganate.

10. A method for production of a water-proof briquette which comprises mixing an oxidizing agent with powders of a combustible solid material, adding a solution of brittle nitrocotton and/or cellulose acetate to the mixture followed by further mixing, compression-molding the resultant mixture and then applying at least once a solution of brittle nitrocotton and/or cellulose acetate on the surface of the molded product.

11. A method for production of a water-proof briquette which comprises mixing ceresine with powders of a combustible solid material, compression-molding the resultant mixture and then applying at least once a solution of brittle nitrocotton and/or cellulose acetate on the surface of the molded product.

12. A method for production of a water-proof briquette which comprises mixing an oxidizing agent with powders of a combustible solid materials, mixing ceresine therewith, compression-molding the resultant mixture and then applying at least once a solution of brittle nitrocotton and/or cellulose acetate on the surface of said molded product.

13. The method as claimed in claim 10, claim 11 or claim 12, further comprising drying the solution of brittle nitrocotton and/or cellulose acetate to provide a water-impermeable, separate, continuous layer on the surface of the molded product.

14. The method as claimed in claim 10 or 12 wherein the mixing of the powders of the combustible solid material with the oxidizing agent is effected by adding the powders of the combustible solid material to an aqueous solution of the oxidizing agent, admixing under stirring and drying.

15. The method as claimed in claim 10 or 12 wherein the mixing of the powders of the combustible solid material with the oxidizing agent is effected by grinding the oxidizing agent into fine powders, adding powders of the combustible solid material to said fine powders and then mixing.

16. The method as claimed in any one of claims 10 to 12 wherein the solution of brittle nitrocotton is a solution prepared by dissolving brittle nitrocotton in acetone or a mixed solvent of acetone-amyl acetate.

17. The method as claimed in any one of claims 10 to 12 wherein the solution of cellulose acetate is a solution prepared by dissolving cellulose acetate in acetone or a mixed solvent of acetone-amyl acetate.

18. The method as claimed in claim 11 or 12 wherein the mixing of ceresine is effected by adding ceresine to powders of a combustible solid material, heating the mixture for melting ceresine and then mixing them.

19. The method as claimed in claim 11 or 12 wherein the mixing of ceresine is effected by melting ceresine, adding thereto powders of a combustible solid material and then mixing them.

* * * * *